Oct. 17, 1944.  W. B. MARTIN ET AL  2,360,702

TELETYPEWRITER SYSTEM

Filed Oct. 9, 1941

INVENTORS
W. B. Martin and
BY R. A. Weinmann
ATTORNEY

Patented Oct. 17, 1944

2,360,702

UNITED STATES PATENT OFFICE 2,360,702

TELETYPEWRITER SYSTEM

Wade B. Martin, Westwood, N. J., and Robert Henry Weinmann, Roslyn, N. Y., assignors to American Telephone and Telegraph Company, a corporation of New York Application October 9, 1941, Serial No. 414,250

8 Claims. (Cl. 178—69)

This invention relates to circuit controlling devices and particularly to an arrangement employing gas-filled tubes, vacuum tubes and timing circuits for controlling the operation of a device for measuring the distortion of telegraph signals.

In the measurement of distortion of telegraph signals, particularly those employed in teletypewriter transmission, it is customary to employ a device having condensers that may be charged by a source of current, the magnitude of the charge depending upon the time during which the source is connected to the condenser. The duration of that connection depends upon the length of the signal impulse to be measured. By measuring the magnitude of the charge by suitable apparatus the length of the signal impulse may thereby be determined. Such a measuring device is shown in the patent to F. A. Cowan, No. 2,132,678, dated October 11, 1938. In the arrangement therein shown, a start-stop distributor of a mechanical type is provided to establish reference points for commencing the charge on the comparison condensers.

In the copending application of W. B. Martin, Serial No. 380,440, filed Feb. 25, 1941, there is disclosed a type of distributor employing a plurality of relays, vacuum tubes and timing circuits that performs the same function as the mechanical distributor shown in the aforesaid patent to Cowan.

The present invention resides in a type of distributor which is characterized by the use of gas-filled tubes in addition to the vacuum tubes such as those disclosed in the aforesaid Martin application and is further characterized by the employment of fewer relays than are required by the Martin device, thereby reducing the number of moving parts in the distributor.

Figure 1:
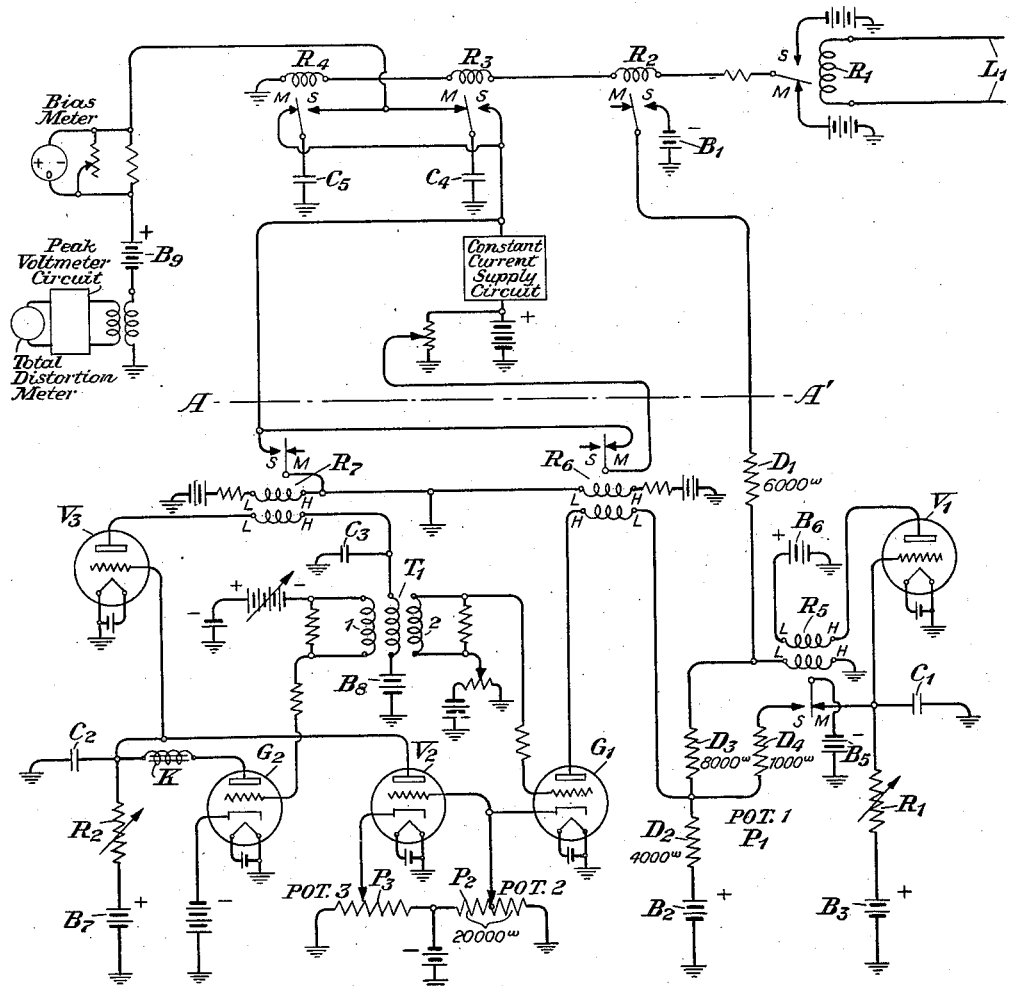
Figure 2A:
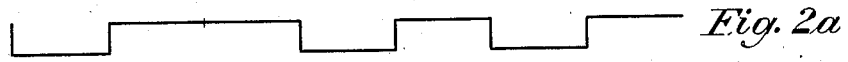
Figure 2B:
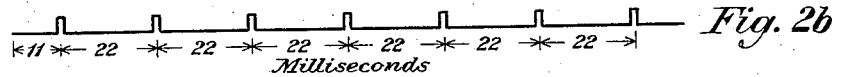

This invention will be clearly understood from the following description, when read in connection with the attached drawing, of which Figure 1 shows schematically a form of embodiment of the invention and Figs. 2a and 2b serve to illustrate the mode of operation of the circuit in which this invention is embodied.

In Fig. 1, $L_1$ represents a signal circuit over which teletypewriter signals are being transmitted to the measuring apparatus shown in the figure. The armature of the receiving relay $R_1$ is connected to the windings of relays $R_2$, $R_3$ and $R_4$ so that the armatures of the latter relays will follow the movements of the armature of relay $R_1$. The armature of relay $R_2$ is connected to the lower winding of the start-stop relay $R_5$, the connection including a resistance $D_1$. Also connected to the same terminal of that winding is the battery $B_2$, the connection including the resistances $D_2$ and $D_3$, which, together with resistance $D_4$, form the potentiometer $P_1$. The resistance $D_4$ is connected between the junction of $D_2$ and $D_3$ and the spacing contact of relay $R_5$. The marking contact of that relay is connected to the grid of the vacuum tube $V_1$ and also to the timing circuit of that tube which includes the condenser $C_1$, the resistance $R_1$ and the battery $B_3$. The negatively poled battery $B_5$ is connected to the armature of relay $R_5$ and its magnitude is such that when applied to the grid of the tube $V_1$ it will prevent the flow of current through the said tube. The plate current is supplied by the battery $B_6$ which is connected to the upper winding of relay $R_5$. The windings of that relay and of the other relays herein shown are so poled that when the positive terminal of a battery is connected to the lower numbered terminal of the winding, indicated by the letter L, the armature will move, or will tend to move, to its marking contact. On the other hand, if the negative pole of the battery is connected to the lower numbered terminal of a winding, the armature will tend to move, or will move, to its spacing contact. The junction between the resistances $D_2$ and $D_3$ is connected to the plate of the gas-filled tube $G_1$, the connection including the lower winding of the relay $R_6$. The cathode of that tube is connected to the grid of the vacuum tube $V_2$ and also to the potentiometer $P_2$. The cathode of the vacuum tube $V_2$ is connected to the potentiometer $P_3$ and the plate of that tube is connected to the grid of the vacuum tube $V_3$ and also to the timing circuit that includes the condenser $C_2$, resistance $R_2$ and the battery $B_7$. The plate of the vacuum tube $V_3$ is connected to the battery $B_3$, the connection including a winding of relay $R_7$ and also a winding of the transformer $T_1$. That connection also includes, in shunt, the condenser $C_3$. The transformer $T_1$ has three windings of which the left-hand winding is connected to the grid of the gas-filled tube $G_2$ and the right-hand winding is connected to the grid of the tube $G_1$, the connection including a suitable source of biasing potential. The plate of the tube $G_2$ is connected to the timing circuit of the vacuum tube $V_3$, the connection including a choke coil K.

The apparatus just described, which constitutes the distributor for the transmission measuring set is connected to the measuring circuit which comprises the apparatus shown above the dot and dash line A—A'. That apparatus comprises the comparison condensers $C_4$ and $C_5$ which are connected to the armatures of relays $R_3$ and $R_4$ in such manner that they will receive a charge from the constant current supply circuit. The condenser receiving the charge is grounded in the optimum middle of each received pulse by the momentary operation of relay $R_7$, the manner of doing which will be described later. The magnitude of the charge to be measured will depend on the length of the received signal after the optimum middle of the signal. The magnitude of the charge upon those condensers is measured by the circuit that includes the bias meter, the total distortion meter and the battery $B_9$. In the arrangement shown the relay $R_6$ serves to apply to one of the condensers a voltage exactly equal to the voltage of battery $B_9$, which application is made during the time of the stop impulse. Relay $R_7$ serves to ground the condensers in the optimum middle of each pulse, thereby putting the condenser in condition for the reception of the next charge.

The manner in which the aforedescribed circuit functions to measure distortion of teletypewriter signals is as follows:

Let it be assumed that the armature of relay $R_1$ is upon its marking contact, which represents, as shown in Fig. 2a, the situation during the existence of the stop impulse. Accordingly, the armatures of relays $R_2$, $R_3$ and $R_4$ will likewise be upon their marking contacts. Since the positive battery $B_2$ is connected to the lower winding of relay $R_5$, its armature will be upon its marking contact and the negative battery $B_5$, here assumed to be of 130 volts, will be connected to the grid of the tube $V_1$ and also to the condenser $C_1$. That voltage is sufficient to suppress the plate current in the tube $V_1$. The battery $B_2$ will apply a voltage to the plate of the gas tube $G_1$ and since that tube has been previously fired, it will be conductive. That current moves the armature of relay $R_6$ to its marking contact and also creates and applies a voltage of 2 volts positive to the grid of the vacuum tube $V_2$. That tube likewise operates and applies a negative potential, normally approximately 30 volts but variable at will, from the potentiometer $P_3$ to the condenser $C_2$ and to the grid of the vacuum tube $V_3$, thereby suppressing the plate current in that tube. The operation of relay $R_6$ to its marking contact connects the condenser $C_5$ to the potentiometer associated with the constant current supply circuit and applies to that condenser a comparison voltage that is substantially equal to the voltage of the battery $B_9$, the purpose of which will later be made clear. Referring again to the distributing circuit, it may be stated that the gas tube $G_2$ is now non-conducting, and also since the tube $V_3$ is non-conducting the relay $R_7$ remains upon its marking contact.

Now let it be assumed that a starting impulse is received by the relay $R_1$ which causes its armature to move to its spacing contact. Thereupon the armatures of relays $R_2$, $R_3$ and $R_4$ will also move to their spacing contacts. When the armature of relay $R_2$ touches its spacing contact it connects the negative pole of the battery $B_1$ to the lowering winding of relay $R_5$, causing thereby a reversal of current in that winding and the movement of the armature of that relay to its spacing contact. That relay will thereupon be locked by the flow of current from the 130 voltage battery $B_5$ through the resistances $D_3$ and $D_4$ and the lower winding of that relay. That movement of the armature removes the 130 volt battery from the grid of the tube $V_1$ and also from the condenser $C_1$ and permits that condenser to discharge through its timing circuit, which discharge takes place in one-sixth of a second, which is equal to the length of the teletypewriter signal as shown in Fig. 2a.

The connection of the battery $B_5$ to its spacing contact changes the voltage on the plate of the gas tube $G_1$ from 85 volts positive to 70 volts negative, thereby suppressing current in the tube $G_1$ and operating relay $R_6$ to its spacing position. The suppression of current in the gas tube $G_1$ effects a change of potential upon the grid of the vacuum tube $V_2$ from 2 volts positive to 65 volts negative, thereby rendering the tube $V_2$ non-conductive. This latter action removes the negative voltage from the grid of the tube $V_3$ and also from the condenser $C_2$ and permits the latter to discharge through its timing circuit, which action, as indicated in Fig. 2b, occurs in 11 ms. When condenser $C_2$ is discharged the plate current will flow through the tube $V_3$, which current flows through the central winding of the transformer $T_1$ and also through the lower winding of relay $R_7$. The effect of that upon relay $R_7$ is to move its armature to its spacing contact, thereby grounding condenser $C_4$. The flow of current through the middle winding of $T_1$ induces a voltage in the left-hand winding and that voltage, when applied to the grid of the gas tube $G_2$, effects the firing of that tube. The tube $G_2$ thereupon becomes conductive and applies approximately 130 volts negative potential to the grid of the tube $V_3$ and also to the condenser $C_2$. That charges the condenser and also suppresses the plate current in the tube $V_3$. The cessation of current in the lower winding of relay $R_7$ permits the movement of its armature to its marking contact under the influence of current in its upper winding.

As the current in the middle winding of the transformer $T_1$ fell in magnitude it induced a potential in the right-hand winding of that transformer which would be applied to the grid of the gas tube $G_1$, but since there is no positive potential across that tube, no action therein takes place at this time. On the other hand, the building up of a potential of 130 volts upon condenser $C_2$ creates a counter electromotive force on the gas tube $G_2$ which suppresses the current therein and it is extinguished, which action is aided by the retardation coil K. Thereupon the condenser $C_2$ will again begin to discharge and at the end of 22 ms. it will fall to such a point as to permit the flow of plate current through the tube $V_3$. As previously explained, that current is supplied by the battery $B_8$ and it will produce an effect in the transformer $T_1$ and the relay $R_7$. The armature of that relay moves to its spacing contact and grounds condenser $C_5$ because that condenser is connected to the marking contact of relay $R_4$ corresponding to the first marking impulse signal character shown in Fig. 2a. The flow of current through the middle winding of the transformer $T_1$ induces a voltage in its left-hand winding which fires again the gas tube $G_2$. That action results in the application of 130 volts negative potential to the condenser $C_2$ and the grid of the tube $V_3$. This terminates the flow of plate current in the tube $V_3$ and causes relay $R_7$ to drop back to its marking contact.

As shown in Fig. 2b, that cycle of operation is repeated seven times during the interval in which relay $R_5$ remains locked. At the end of that time the condenser $C_1$ will have discharged to a point such as to permit the flow of plate current in the tube $V_1$. Now, when the armature of relay $R_2$ falls back upon its marking contact corresponding to the receipt of the stop impulse of the teletypewriter signal, the battery $B_1$ will be removed from the circuit of the relay $R_5$ and that relay will be under the control of the plate current flowing through its upper winding. That will cause the armature of the relay to move to its marking contact, which in turn will charge the condenser $C_1$ to 130 volts potential.

The removal of the battery $B_5$ from the spacing contact of relay $R_5$ changes the voltage upon the gas tube $G_1$ from 70 volts negative to 85 volts positive. On the next collapse of the current in the plate circuit of the tube $V_3$, the voltage set up in the right-hand winding of the transformer $T_1$, when applied to the grid of the gas tube $G_1$, will effect the firing of that tube. That will cause the application of 2 volts positive to the grid of the tube $V_2$, and upon that tube being conductive, 30 volts negative will be applied by the potentiometer $P_3$ by the condenser $C_2$ and the grid of the tube $V_3$, thereby suppressing the plate current in the tube $V_3$. Relay $R_6$ will thereupon operate, moving its armature to its marking contact and completing the circuit whereby the comparison voltage will be applied to the condenser $C_5$ during the existence of a stop impulse. The distributor is now in its idle position, ready to start its cycle of operations upon the receipt of the next signal character.

It is desirable to point out that the function of condenser $C_3$ is to prolong the plate current 5 ms. in order to give the relay $R_7$ sufficient time to completely discharge the comparison condensers $C_4$ and $C_5$.

In the cycle of operations the electric distributor herein described has performed all the functions of the mechanical distributor heretofore employed in this transmission measuring set. After receiving the starting impulse which removes the comparison voltage from the condensers $C_4$ and $C_5$, the device waits 11 ms. and then grounds those condensers seven times for 5 ms. each, at intervals of 22 ms., and then reconnects the comparison voltage to the comparison condensers. It is to be understood that the electrical magnitudes herein disclosed are purely illustrative and are not intended to be construed as a limitation upon this invention.

It is also to be understood that the invention is not limited to a pulse-time of 22 ms. since this may be varied at will within practical limits. Furthermore, while the character is described as being one-sixth second in length and allowing 7 pulses to the character, both the speed and the number of pulses may be varied widely without departing from the spirit and scope of this invention.

While the invention has been disclosed as embodied in a particular form, it is capable of embodiment in other forms without departing from the spirit and scope of the appended claims.

What is claimed is:

1. In a system for measuring the distortion of teletypewriter signals, the combination with a receiving relay responsive to the impulses of the said signals of a start-stop relay connected to the said receiving relay, a vacuum tube having a timing circuit connected to the grid thereof, the said timing circuit being arranged to be charged and permitted to discharge by the operation of the said start-stop relay, a gas-filled tube, a potentiometer connected to said start-stop relay and to said gas-filled tube, the said potentiometer having a source of positive potential normally connected thereto whereby a discharge will take place in the gas-filled tube when it has been fired, a second vacuum tube having its grid connected to the cathode of the said gas-filled tube whereby a positive potential is applied to said grid upon each operation of the said gas-filled tube, a third vacuum tube having a timing circuit connected to the grid thereof, the said timing circuit being also connected to the said second vacuum tube in such manner as to be charged and permitted to discharge upon each operation of said second vacuum tube, and a relay operable upon each discharge of said third vacuum tube, adapted to discharge a condenser and to permit its subsequent charging.

2. In a system for measuring the distortion of teletypewriter signals the combination with a vacuum tube having a timing circuit connected therewith whose time of discharge equals the length of a teletypewriter signal, of a start-stop relay having a source of negative potential connected therewith to charge the condenser of the said timing circuit and a pulsating circuit including two gas-filled tubes, a second and a third vacuum tube, the said third tube having another timing circuit connected therewith and a transformer having a primary and a plurality of secondary windings, the primary winding being connected to the plate of the third vacuum tube and each secondary winding being individual to and connected with the grid of a gas filled tube, one of said gas-filled tubes being arranged to apply a positive voltage to the said second vacuum tube whereby the condenser of said other timing circuit may be charged to a given voltage to suppress the plate current through the said third vacuum tube, thereby inducing a voltage in the secondary windings of said transformer to control the operation of the said gas filled tubes.

3. The method of measuring distortion of teletypewriter signals which consists in removing the source of negative voltage from a timing circuit of a vacuum tube upon the occurrence of the first mark-to-space transition of the said signal, removing thereby a source of negative voltage from the timing circuit of a second vacuum tube thereby permitting a plate current to flow at the end of a given period of time and to effect the discharge of a measuring condenser during the period of flow of the plate current, inducing by the said plate current flow a voltage in a transformer, applying the induced voltage to a gas-filled tube whereby a negative voltage of higher potential may be applied to the timing circuit of the said second vacuum tube, thereby stopping the plate current flow of that tube.

4. In a system for measuring the distortion of teletypewriter signals, the combination with a source of teletypewriter signals of a measuring circuit including a plurality of reference condensers each connected with a relay controlled by the said teletypewriter signals, and a distributor circuit including a relay having a plurality of windings one of which is connected to the said source of signals, a vacuum tube having its plate circuit connected with the other winding of the said relay, a timing circuit having a condenser and resistance connected to the grid of the vacuum tube and to one contact of the relay, a source of negative potential connected to the armature of said relay, a gas-filled tube having its plate connected to a potentiometer including the other contact of said first relay, the connection including a winding of a second relay, a second vacuum tube having a source of negative potential connected to the grid thereof and having its plate connected to the grid of a third vacuum tube, a second gas-filled tube having its plate connected to the timing circuit of said third vacuum tube, a third relay controlled by said third vacuum tube to effect the discharge of the said reference condenser.

5. In a system to measure the distortion of the teletypewriter marking and spacing impulses the combination with a transmission measuring device including condensers adapted to be charged during the receipt of the said impulses, the magnitude of the charge depending upon the duration of a given impulse, and a distributing device responsive to the received impulses and adapted to control the connection of the said condensers to a source of voltage, the said distributing device including a vacuum tube having a timing circuit by which its operation is delayed until the completion of the receipt of the teletypewriter signal, a relay to remove the control voltage from the grid of the said tube and to apply it to a gas-filled tube, thereby suppressing its operation, a vacuum tube controlled by said gas-filled tube thereby rendering it non-conductive, a third vacuum tube having a timing circuit connected therewith adapted to time the pulses of said third tube, a second gas-filled tube adapted to be fired by the operation of said third vacuum tube, and means controlled by said third vacuum tube to alternately discharge said condensers and to permit their being charged a fixed number of times during the discharge of the timing circuit connected with the first mentioned vacuum tube.

6. In a device for distributing the impulses of a teletypewriter signal to a distortion measuring circuit, the combination with a vacuum tube having a timing circuit, including a condenser, connected therewith to prevent a plate-filament discharge of the said vacuum tube until the termination of a prefixed interval of time after the receipt of the start-impulse of the said teletypewriter signal, means responsive to the receipt of the said start-impulse to start the discharge of the said condenser, a second vacuum tube also having a timing circuit, including a condenser, connected therewith to effect the discharge of the said second vacuum tube once during the receipt of each impulse of said teletypewriter signal, and means to control the functioning of the timing circuit of the said second vacuum tube, the said means including a gas filled tube, the plate of which is charged positively during the receipt of the stop-impulse of said teletypewriter signal, and the cathode of which is connected to the grid of a third vacuum tube having its plate connected to the timing circuit of the said second vacuum tube and its cathode connected to a source of negative potential whereby when a discharge occurs in said gas filled tube and said third vacuum tube a negative potential will be applied to said second vacuum tube and to its timing circuit sufficient to stop the discharge of the said second vacuum tube and to prevent the subsequent discharge until the elapse of a prefixed interval of time corresponding to the length of a teletypewriter signal impulse.

7. The invention defined by claim 6 further characterized by a second gas filled tube connected to and having means to apply a negative voltage to the said second vacuum tube and its timing circuit whenever the said second gas filled tube is fired, and a transformer having a primary winding and a pair of secondary windings, the primary winding being connected into the plate circuit of the said second vacuum tube and each of said secondary windings being connected to the grid of one of the gas filled tubes, whereby a positive voltage is applied thereto upon each discharge of the said second vacuum tube to effect the firing of the said gas filled tubes whenever a positive voltage is applied to the plates thereof.

8. The invention defined by claim 6 characterized by a second gas-filled tube connected to and having means to apply a negative voltage to the said second vacuum tube and its timing circuit whenever the said second gas-filled tube is fired, and a transformer having a primary winding and a pair of secondary windings, the primary winding being connected into the plate circuit of the said second vacuum tube, and each of said secondary windings being connected to the grid of one of the gas-filled tubes, whereby a positive voltage is applied thereto upon each discharge of the said second vacuum tube to effect the firing of the said gas-filled tubes whenever a positive voltage is applied to the plates thereof, and further characterized by the inclusion of a relay having a winding included in the plate circuit of the said second vacuum tube so as to operate upon each discharge of the said vacuum tube, and a plurality of measuring condensers connected to the said relay and adapted to be discharged upon each operation of the said relay by the current of the said plate circuit.

WADE B. MARTIN.
ROBERT HENRY WEINMANN.